United States Patent
Tsukiai

(10) Patent No.: US 10,418,807 B2
(45) Date of Patent: Sep. 17, 2019

(54) SURGE PROTECTION DEVICE AND FIELD DEVICE INCLUDING SURGE PROTECTION DEVICE

(71) Applicant: YOKOGAWA ELECTRIC CORPORATION, Tokyo (JP)

(72) Inventor: Toshiya Tsukiai, Tokyo (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 273 days.

(21) Appl. No.: 15/422,693

(22) Filed: Feb. 2, 2017

(65) Prior Publication Data
US 2017/0244242 A1  Aug. 24, 2017

(30) Foreign Application Priority Data
Feb. 19, 2016  (JP) ................................. 2016-030148

(51) Int. Cl.
  *H02H 9/04* (2006.01)
  *H01T 4/04* (2006.01)

(52) U.S. Cl.
  CPC ............... *H02H 9/044* (2013.01); *H01T 4/04* (2013.01)

(58) Field of Classification Search
  CPC ................................ H02H 9/044; H01T 4/04
  See application file for complete search history.

(56) References Cited

U.S. PATENT DOCUMENTS

| | | | | |
|---|---|---|---|---|
| 5,412,526 A | * | 5/1995 | Kapp ..................... | H02H 3/046 360/111 |
| 5,706,160 A | * | 1/1998 | Latuszkin .............. | H02H 9/044 307/119 |
| 2004/0160724 A1 | * | 8/2004 | Bencivenga ......... | G05B 19/058 361/118 |
| 2014/0269829 A1 | * | 9/2014 | Bronczyk .............. | G01K 1/024 374/152 |

FOREIGN PATENT DOCUMENTS

| | | |
|---|---|---|
| EP | 0547532 A1 | 6/1993 |
| JP | 58-76154 U | 5/1983 |
| JP | 06-216433 A | 5/1994 |
| JP | 7-212971 A | 8/1995 |
| JP | 8-212905 A | 8/1996 |
| JP | 9-82454 A | 3/1997 |

* cited by examiner

*Primary Examiner* — Scott Bauer
(74) *Attorney, Agent, or Firm* — Sughrue Mion, PLLC

(57) ABSTRACT

A surge protection device includes: a pair of terminal fittings to be connected to a pair of power supply terminals of a field device together with a power supply cable; a circuit board on which a surge protection element is mounted, the surge protection element including two electrodes connected to the pair of terminal fittings and a ground electrode configured to cause a surge current to flow to a ground when a surge voltage is applied between the two electrodes; an earth wiring cable connected to the ground electrode; and a main body that houses the circuit board, the main body being configured such that the pair of terminal fittings and the earth wiring cable protrude from an inside of the main body to an outside.

14 Claims, 5 Drawing Sheets

SURGE PROTECTION DEVICE AND FIELD DEVICE INCLUDING SURGE PROTECTION DEVICE

CROSS-REFERENCE TO RELATED APPLICATION

This application claims priority from Japanese Patent Application No. 2016-030148 filed with the Japan Patent Office on Feb. 19, 2016, the entire content of which is hereby incorporated by reference.

BACKGROUND

1. Technical Field

The present disclosure relates to a surge protection device and a field device including the surge protection device.

2. Description of the Related Art

In general, field devices include power supply terminals. Electrical power necessary for operation is supplied to the field device via a power supply cable connected to the power supply terminals. In two-wire transmitters, the power supply cable serves also as an output signal cable for a current that is variable within a range of 4 to 20 mA.

An instantaneous and high abnormal voltage called a surge voltage may be present in the power supply cable due to, for example, influence of lightning strikes or high-voltage facilities. In order to protect the field device from the surge voltage, a surge protection device (also called a lightning protector, arrester, surge absorber, transient protector, or the like) is used.

For example, the surge protection device is mounted on a circuit board of the field device, or is installed on the field device as a surge protection module. The surge protection device to be used as the surge protection module includes a pair of positive and negative power supply-side terminals to which the power supply cable is to be connected, and a pair of positive and negative device-side terminals to be connected to the power supply terminals of the field device to be protected. A surge protection element is connected between the positive and negative terminals.

As the surge protection element, a metal oxide varistor, an avalanche diode, a gas discharge tube, a surge protection thyristor, or the like is used. Further, a filtering function intended for noise reduction or the like may be incorporated into the surge protection device.

As a related document of this technical field, for example, JP-A-6-216433 is given.

SUMMARY

A surge protection device includes: a pair of terminal fittings to be connected to a pair of power supply terminals of a field device together with a power supply cable; a circuit board on which a surge protection element is mounted, the surge protection element including two electrodes connected to the pair of terminal fittings and a ground electrode configured to cause a surge current to flow to a ground when a surge voltage is applied between the two electrodes; an earth wiring cable connected to the ground electrode; and a main body that houses the circuit board, the main body being configured such that the pair of terminal fittings and the earth wiring cable protrude from an inside of the main body to an outside.

DESCRIPTION OF THE EMBODIMENTS

Figure 1:
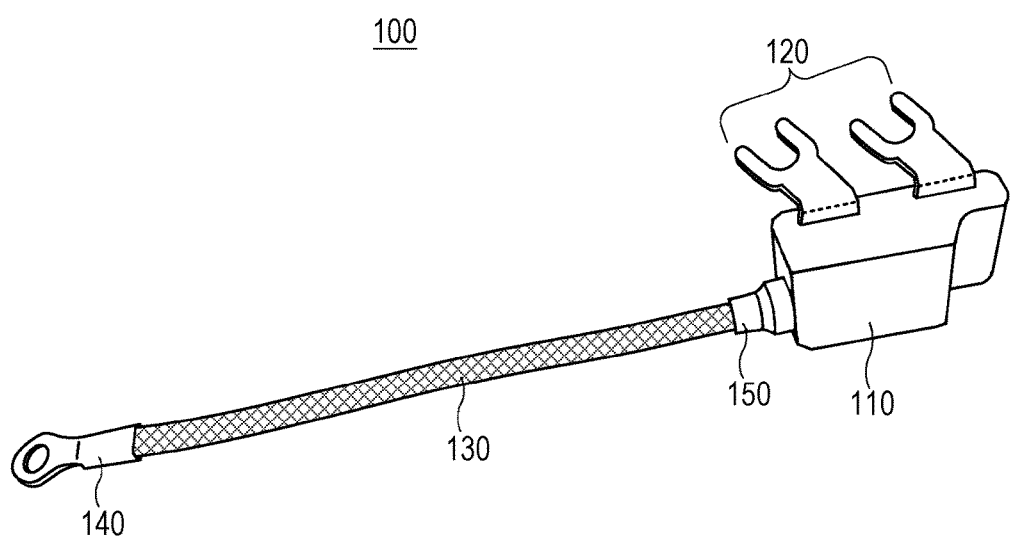
FIG. 1 is a perspective view illustrating an outer shape of a surge protection device according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When a modular surge protection device is connected to an explosion-proof field device, the surge protection device connected to power supply terminals of a terminal block is housed in a case of the field device. Further, in many cases, the field device includes a plurality of terminals such as sensor terminals and an earth terminal in addition to the power supply terminals. Wiring is installed on each of the terminals as necessary. Therefore, a space for laying wires and a working space for wiring are secured inside the case. In order to secure the spaces, downsizing of the surge protection device is desirable.

Moreover, the surge protection device protects the field device from a surge voltage by causing a surge current to flow through a surge protection element. Therefore, the surge protection element per se may be damaged from the surge voltage. In case of such a risk, it is preferable that the surge protection device can be replaced easily by facilitating the work of wiring and the like.

It is an object of the present disclosure to provide a surge protection device installable on a field device, small in size; and replaceable easily.

A surge protection device according to a first aspect of the present disclosure includes: a pair of terminal fittings to be connected to a pair of power supply terminals of a field device together with a power supply cable; a circuit board on which a surge protection element is mounted, the surge protection element including two electrodes connected to the pair of terminal fittings and a ground electrode configured to cause a surge current to flow to a ground when a surge voltage is applied between the two electrodes; an earth wiring cable connected to the ground electrode; and a main body that houses the circuit board, the main body being configured such that the pair of terminal fittings and the earth wiring cable protrude from an inside of the main body to an outside.

Here, the pair of terminal fittings may be directly mounted on the circuit board.

A field device according to a second aspect of the present disclosure includes: the surge protection device; and a case main body in which the pair of power supply terminals is provided and the surge protection device is housed.

Here, the field device may further include: a power supply terminal base provided inside the case main body, the power supply terminal base being provided with the pair of power supply terminals disposed thereon; and an other-terminal base provided inside the case main body, the other-terminal base being provided with a terminal other than the power supply terminals disposed thereon. A height of the power supply terminal base and a height of the other-terminal base may be different from each other.

The field device may further include partition walls provided on a periphery of the pair of power supply terminals and the terminal other than the power supply terminals and configured to secure electrical isolation between the pair of power supply terminals and the terminal other than the power supply terminals.

A surge protection device according to a third aspect of the present disclosure includes: a pair of terminal fittings to be connected to a power supply cable of a device to be protected; a circuit board on which a surge protection element is mounted, the surge protection element including two electrodes connected to the pair of terminal fittings and a ground electrode configured to cause a surge current to flow to a ground when a surge voltage is applied between the two electrodes; an earth wiring cable connected to the ground electrode; and a main body that houses the circuit board, the main body being configured such that the pair of terminal fittings and the earth wiring cable protrude from an inside of the main body to an outside. The pair of terminal fittings serves also as connection terminal fittings for the device to be protected.

According to the aspects of the present disclosure, the surge protection device installable on a field device, small in size, and replaceable easily and the field device on which the surge protection device is installed are provided.

An embodiment of the present disclosure is described with reference to the drawings, FIG. 1 is a perspective view illustrating an outer shape of a surge protection device 100 according to this embodiment. The surge protection device 100 is suitably installed on a field device. As one example, this embodiment is directed to a case where the surge protection device 100 is installed on a two-wire temperature transmitter serving as the field device.

As illustrated in FIG. 1, the surge protection device 100 includes a main body 110, an earth wiring cable 130 extending from the main body 110, and a pair of terminal fittings 120. A crimp terminal 140 is attached to a distal end of the earth wiring cable 130. A root of the earth wiring cable 130 is protected by a heat-shrink tube 150. The terminal fittings 120 protrude from an inside of the main body 110. The pair of terminal fittings 120 is a bifurcated terminal fitting, and has a Y-shaped distal end. The pair of terminal fittings 120 is arranged along an extending direction of the earth wiring cable 130. For convenience, a surface of the main body 110 on which the terminal fittings 120 protrude is referred to as an upper surface. Further, the extending direction of the earth wiring cable 130 in a stretched state is simply referred to as an extending direction.

Note that the pair of terminal fittings 120 is connected to a pair of power supply terminals of the field device together with a power supply cable. That is, the pair of terminal fittings 120 serves both as fittings to be connected to a power supply cable 310 of a temperature transmitter (field device, or device to be protected) 200 described later, and as connection terminal fittings for the temperature transmitter 200.

In the surge protection device 100 of this embodiment, the terminal fittings 120 serve both as power supply-side terminals to be connected to the power supply cable, and as device-side terminals to be connected to the power supply terminals of the device to be protected.

Figure 2A:
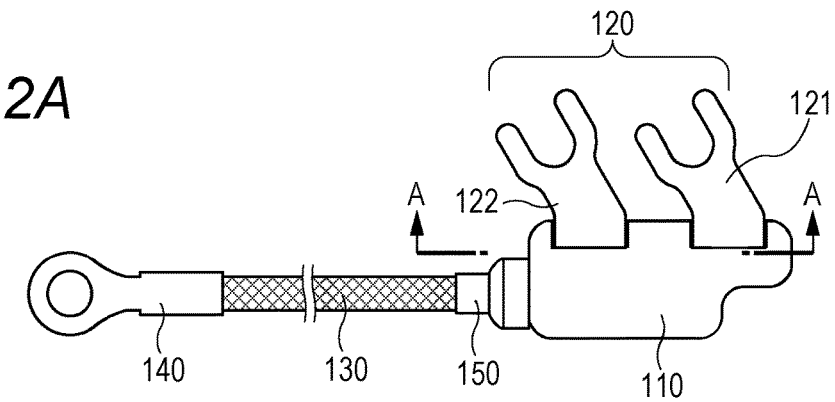
FIG. 2A is a top view of the surge protection device.
Figure 2B:
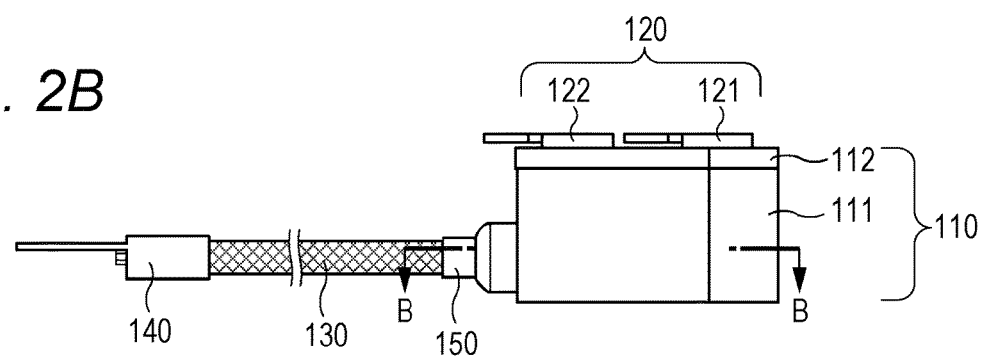
FIG. 2B is a side view of the surge protection device.
Figure 2C:
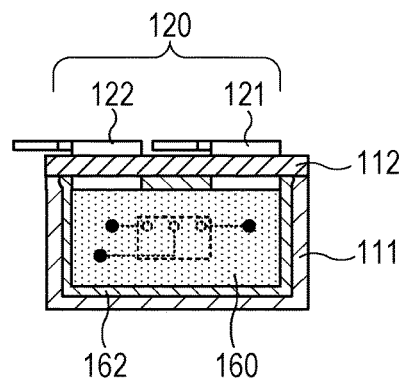
FIG. 2C is a sectional view taken along line A-A of FIG. 2A.
Figure 2D:
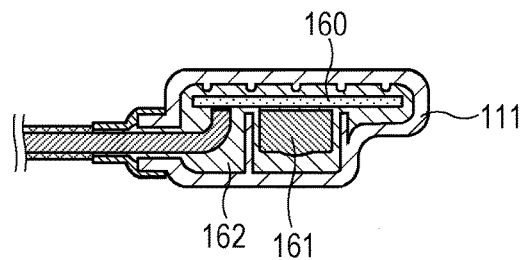
FIG. 2D is a sectional view taken along line B-B of FIG. 2B.

FIG. 2A is a top view of the surge protection device 100, and FIG. 29 is a side view (lateral view) of the surge protection device 100. Further, FIG. 2C is a sectional view taken along line A-A of FIG. 2A, and FIG. 2D is a sectional view taken along line B-B of FIG. 2B.

The pair of terminal fittings 120 includes a positive terminal 121 and a negative terminal 122. The positive terminal 121 and the negative terminal 122 are bent at a right angle in a lateral direction (direction substantially parallel to the upper surface) immediately after protruding from the inside of the main body 110 to the upper surface. The positive terminal 121 and the negative terminal 122 thus bent are further bent from roots thereof so that a direction in which the Y-shaped distal ends extend becomes oblique to the extending direction. The reason why the positive terminal 121 and the negative terminal 122 have such a shape is, as described later, to adjust the positive terminal 121 and the negative terminal 122 to a shape of a terminal block provided inside a case main body of the temperature transmitter.

The main body 110 of the surge protection device 100 includes a case 111 that houses a circuit board 160, and a lid 112 that covers the case 111 from the upper surface side. The inside of the main body 110 is filled with a filler 162 such as silicon for protection.

A three-electrode surge protection element 161 is mounted on the circuit board 160. A positive electrode of the surge protection element 161 is connected to the positive terminal 121. A negative electrode of the surge protection element 161 is connected to the negative terminal 122. A ground electrode of the surge protection element 161 is connected to the earth wiring cable 130. The surge protection element 161 is configured to cause a surge current to flow to an earth (ground) via the ground electrode when a surge voltage is applied between the positive electrode and the negative electrode.

The positive terminal 121 and the negative terminal 122 are directly mounted on the circuit board 160. Further, no other element than the surge protection element 161 is mounted on the circuit board 160. Thus, the circuit board 160 can be downsized. Note that other components may be mounted on the circuit board 160 by selecting a surge protection element 161 having a smaller shape.

In order that the main body 110 may have as small a size as possible while being capable of housing the circuit board 160 on which the surge protection element 161 is mounted, as illustrated in FIG. 2D, the main body 110 has a rectangular shape dented at one corner in top view. The circuit board 160 is disposed closer to an undented longer side of the main body 110.

Figure 3:
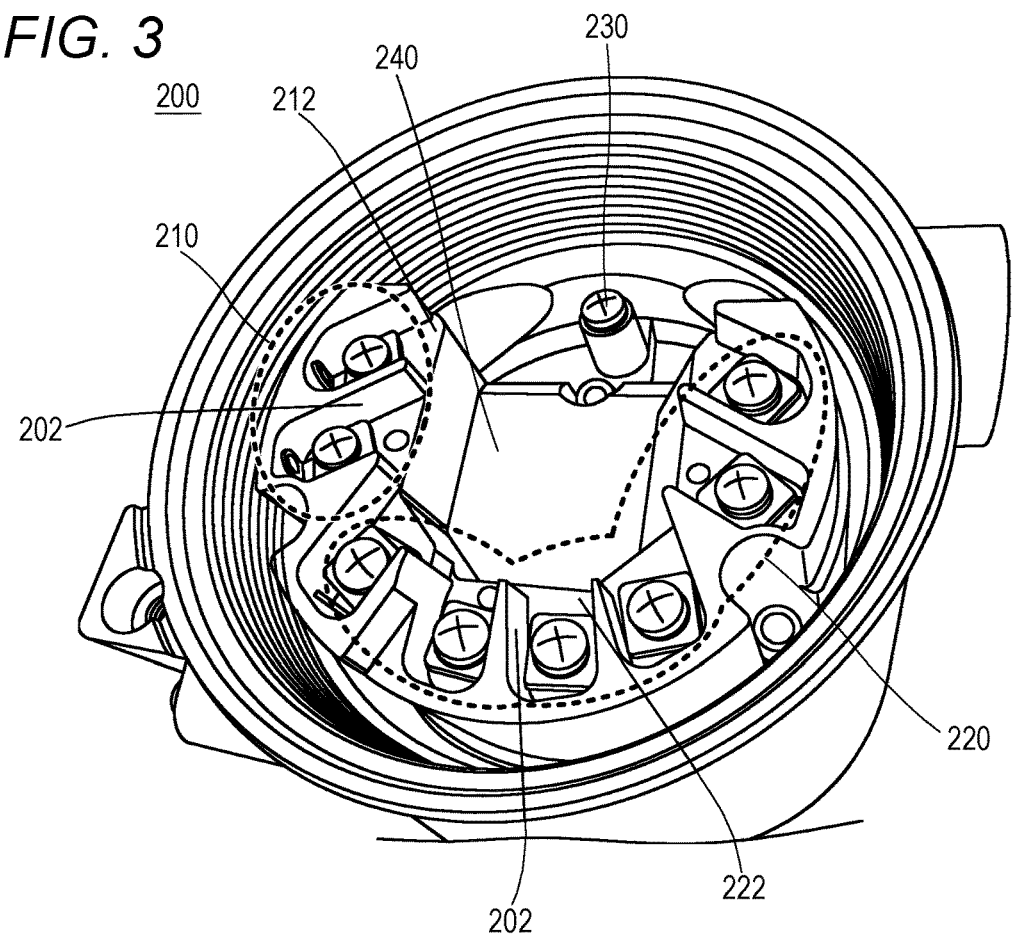
FIG. 3 is a perspective view illustrating a terminal block of a temperature transmitter before the surge protection device is installed thereon.

FIG. 3 is a perspective view illustrating the terminal block of the temperature transmitter 200 before the surge protection device 100 is installed thereon. The terminal block is disposed in a wiring connection chamber that is a partitioned space inside the temperature transmitter 200. On the terminal block, a pair of power supply terminals 210 and a plurality of sensor terminals 220 are provided so as to be arranged arcuately. The power supply cable is connected to the power supply terminals 210. A thermocouple, a resistance thermometer, and/or the like are/is connected to the sensor terminals 220. Further, on the terminal block, an earth terminal 230 is provided so as to be spaced away from the power supply terminals 210 and the sensor terminals 220. The temperature transmitter 200 includes a case main body 250 in which the pair of power supply terminals 210 is provided and the surge protection device 100 is housed.

Partition walls 202 are formed on a periphery of the terminals 210 and 220. The partition wall 202 secures electrical isolation between the terminals 210 and 220. Further, the partition wall 202 serves as a guide for a member (such as the terminal fitting 120) to be connected to the terminal. The power supply terminals 210 are disposed at an end of the arcuate terminal array. Therefore, for convenience of wiring, the partition wall 202 of the power supply terminals 210 is formed so as to extend obliquely to a direction toward the center. The shape of the pair of terminal fittings 120 of the surge protection device 100 and a distance therebetween are adjusted to positions and shapes of the power supply terminals 210 and the partition wall 202 on the periphery of the power supply terminals 210.

In the temperature transmitter 200, a base (power supply terminal base) 212 of the power supply terminals 210 and a base (other-terminal base) 222 of the sensor terminals 220 are formed so as to have different heights from each other. Specifically, the bases 212 and 222 are formed so that the base 212 of the power supply terminals 210 is located higher than the base 222 of the sensor terminals 220. The bases 212 and 222 are provided inside the case main body 250.

Figure 4:
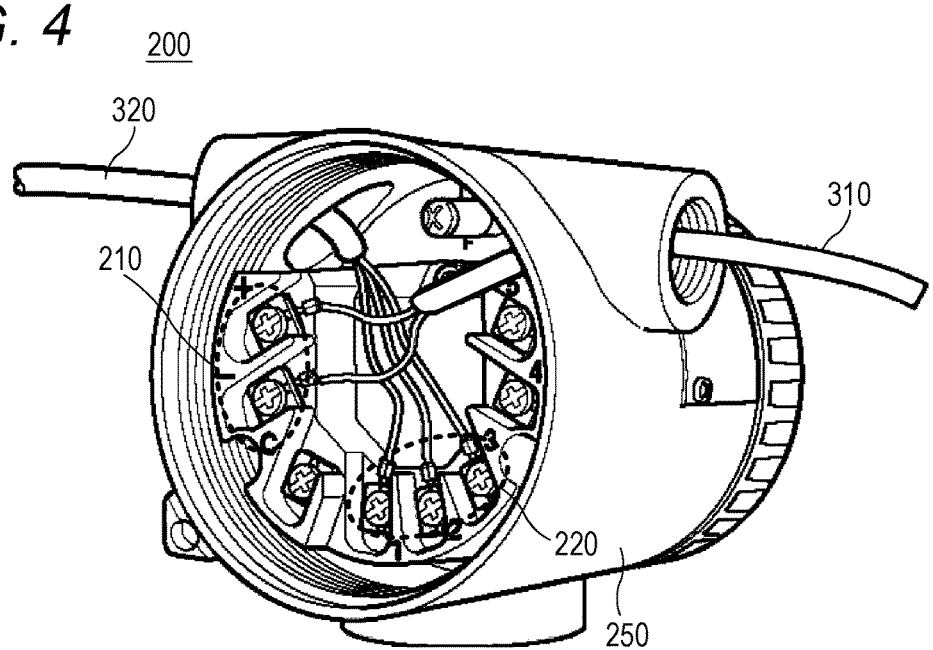
FIG. 4 is a view illustrating wiring of a power supply cable and a sensor cable.

The reason why the base 212 of the power supply terminals 210 is formed so as to be located higher than the base 222 of the sensor terminals 220 is as follows. That is, in this configuration, when wiring of the power supply cable 310 and a sensor cable 320 is installed on the terminals as illustrated in FIG. 4, both the cables can be caused to intersect with each other at a terminal block portion inside the case main body 250. Thus, interference between the cables can be suppressed, and hence the wiring work is facilitated. A recess 240, which is recessed from the bases 212 and 222, is provided on an inner side of the base 212 of the power supply terminals 210 and the base 222 of the sensor terminals 220, which are arranged arcuately. Thus, at a time of replacement of the surge protection device 100, removal of the power supply cable 310 and the sensor cable 320 before the replacement and new connection (attachment) of the power supply cable 310 and the sensor cable 320 are facilitated. That is, the replacement of the surge protection device 100 is facilitated.

Figure 5:
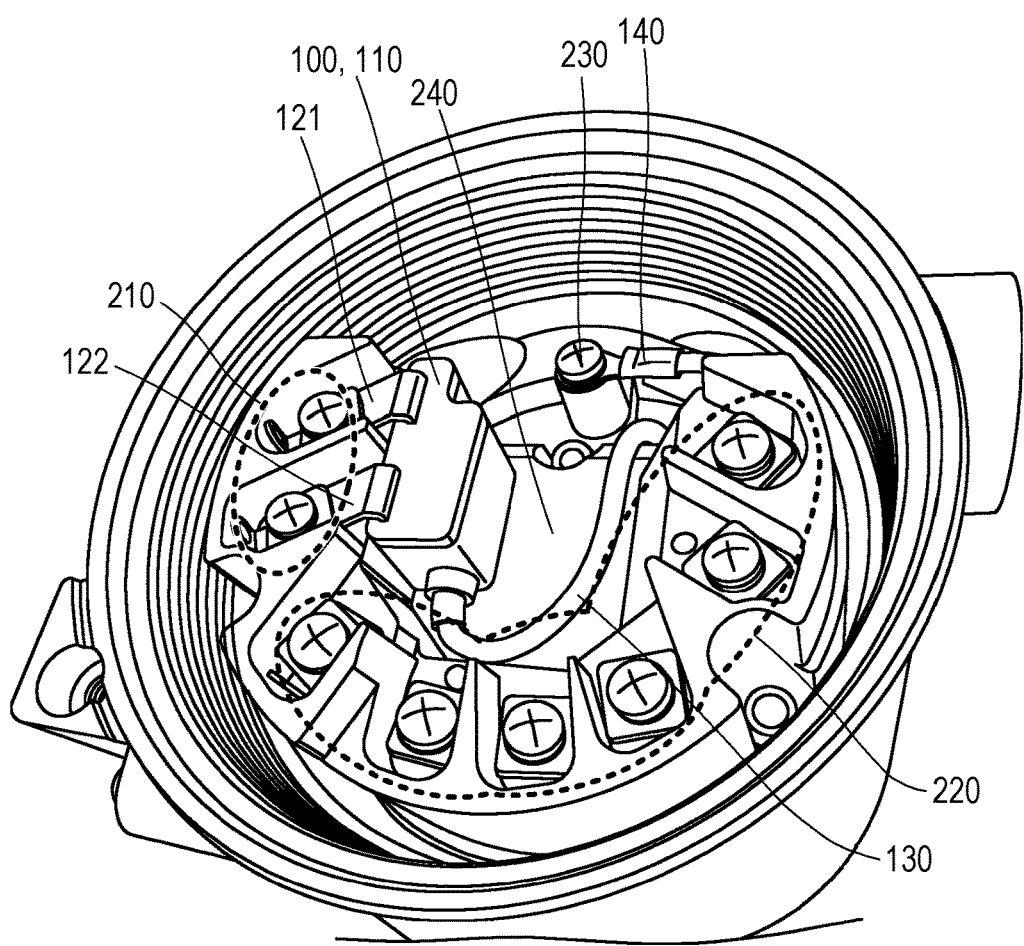
FIG. 5 is a perspective view illustrating the terminal block of the temperature transmitter on which the surge protection device is installed.

As illustrated in FIG. 5, the surge protection device 100 is formed so that the main body 110 is received at one corner of the recess 240 when the pair of terminal fittings 120 is connected to the pair of power supply terminals 210. In this state, the earth wiring cable 130 is routed near a bottom surface of the recess 240. Further, the crimp terminal 140 at the distal end of the earth wiring cable 130 is connected to the earth terminal 230. The earth wiring cable 130 has a length capable of avoiding a situation in which the earth wiring cable 130 is unnecessarily detoured when the earth wiring cable 130 is connected to the earth terminal 230. Further, a depth (height) of the main body 110 is adjusted to a depth of the recess 240 so that positions of the pair of terminal fittings 120 coincide heights of the power supply terminals 210.

The wiring of the power supply cable 310 is installed and screws of the power supply terminals 210 are tightened in a state in which the terminal fittings 120 of the surge protection device 100 are connected to the power supply terminals 210. As a result, the terminal fittings 120 of the surge protection device 100, the power supply cable 310, and the power supply terminals 210 are directly connected to each other at the same position.

The main body 110 of the surge protection device 100 is received in the recess 240 with a minimum necessary size. Therefore, the recess 240 has room in a space thereof (has a space secured sufficiently). This configuration reduces a risk that the surge protection device 100 (main body 110) becomes an obstacle to the wiring of the power supply cable 310 and the sensor cable 320.

When the surge protection element 161 is damaged from the surge voltage, and when maintenance is carried out, the surge protection device 100 can be removed easily by loosening the screws of the power supply terminals 210 and the earth terminal 230. Similarly, the surge protection device 100 can be installed easily.

Figure 6:
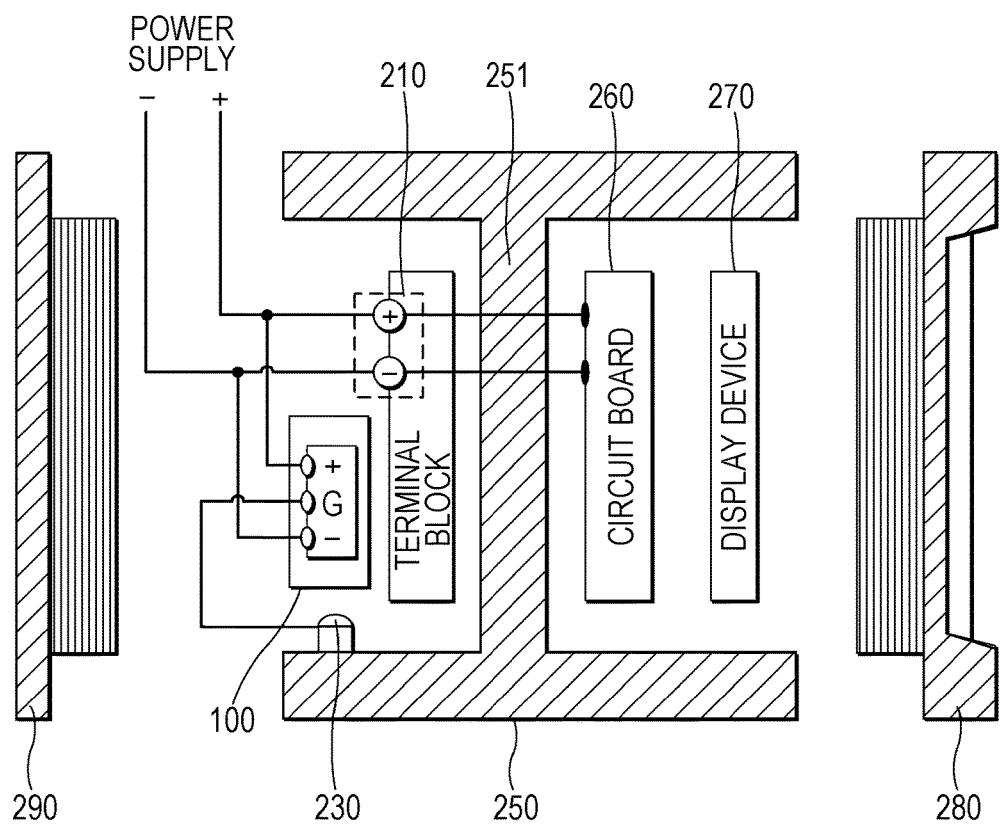
FIG. 6 is a diagram schematically illustrating the temperature transmitter in a case where the surge protection device and the power supply cable are connected to power supply terminals.

FIG. 6 is a diagram schematically illustrating the temperature transmitter 200 in a case where the surge protection device 100 and the power supply cable 310 are connected to the power supply terminals 210. As illustrated in FIG. 6, the case main body 250 is partitioned by an internal partition wall 251 into the wiring connection chamber that houses the terminal block, and into an amplifier chamber. A circuit board 260 and a display device 270 are housed in the amplifier chamber.

In order to meet explosion-proof specifications, the wiring connection chamber is covered with a terminal cover 290, and the amplifier chamber is covered with an amplifier cover 280. The earth terminal 230 to which the earth wiring cable 130 is connected is coupled to the case main body 250. Thus, the case main body 250 is connected to the earth (grounded).

As described above, in the surge protection device 100 of this embodiment, the terminal fittings 120 serve both as power supply-side terminals to be connected to the power supply cable of the device to be protected (field device), and as device-side terminals (connection terminal fittings) to be connected to the power supply terminals of the device to be protected (field device). Further, no other element than the surge protection element 161 is mounted on the circuit board 160. Moreover, the main body 110 is downsized and the shapes of the terminal fittings 120 and the main body 110 are adjusted to the shape of the terminal block on which the surge protection device 100 is installed. Those configurations achieve a surge protection device suitably installable on a field device, small in size, and replaceable easily.

As one example, the embodiment described above is directed to the case where the two-wire temperature transmitter 200 is used as the field device. However, the embodiment of the present disclosure is not limited to the two-wire temperature transmitter, and can be applied widely to, for example, two-wire field devices such as a differential pressure transmitter, a vortex flowmeter, and a pH meter, analog current output units of four-wire field devices to be supplied with electrical power from a commercial power supply or the like, such as an electromagnetic flowmeter, a Coriolis flowmeter, and an ultrasonic flowmeter, and various communication units of four-wire field devices.

Further, in the embodiment described above, the temperature transmitter 200 includes the pair of power supply terminals 210 as one example. In the embodiment of the present disclosure, however, it is only necessary that the field device include at least one pair of power supply terminals. For example, the field device may include a plurality of pairs of power supply terminals. In this case, the pair of terminal fittings 120 of the surge protection device 100 may be connected to one pair of power supply terminals among the plurality of pairs of power supply terminals provided to the field device.

It can also be said that the present disclosure relates to a surge protection device connectable to power supply terminals of a field device.

According to the embodiment of the present disclosure, the following first to third surge protection devices and first and second field devices may be provided.

The first surge protection device is a surge protection device to be installed on a field device including at least one pair of power supply terminals. The surge protection device includes a pair of terminal fittings, a circuit board, an earth wiring cable, and a main body. The pair of terminal fittings is to be connected to the power supply terminals together with a power supply cable. A surge protection element is mounted on the circuit board. The surge protection element includes two electrodes connected to the pair of terminal fittings, and a ground electrode configured to cause a surge current to flow when a surge voltage is applied between the two electrodes. The earth wiring cable is connected to the ground electrode. The main body houses the circuit hoard, and the pair of terminal fittings and the earth wiring cable protrude from the main body to an outside.

The second surge protection device is the first surge protection device in which the pair of terminal fittings is directly mounted on the circuit board.

The first field device is a field device on which the first or second surge protection device is installed. The field device includes a case main body in which the at least one pair of power supply terminals is provided. The surge protection device is housed inside the case main body.

The second field device is the first field device including, inside the case main body, a power supply terminal base on which the pair of power supply terminals is disposed, and an other-terminal base on which a terminal other than the power supply terminals is disposed. A height of the power supply terminal base and a height of the other-terminal base are different from each other.

The third surge protection device is a surge protection device configured to protect a device to be protected from a surge voltage to be applied to a power supply cable. The surge protection device includes a pair of terminal fittings, a circuit board, an earth wiring cable, and a main body. The pair of terminal fittings is to be connected to the power supply cable. A surge protection element is mounted on the circuit board. The surge protection element includes two electrodes connected to the pair of terminal fittings, and a ground electrode configured to cause a surge current to flow when the surge voltage is applied between the two electrodes. The earth wiring cable is connected to the ground electrode. The main body houses the circuit board, and the pair of terminal fittings and the earth wiring cable protrude from the main body to an outside. The pair of terminal fittings serves also as connection terminal fittings for the device to be protected.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A surge protection device comprising:
    a pair of terminal fittings to be physically connected to a pair of power supply terminals of a field device and a power supply cable;
    a circuit board on which a surge protection element is mounted, the surge protection element including two electrodes connected to the pair of terminal fittings and a ground electrode configured to cause a surge current to flow to a ground when a surge voltage is applied between the two electrodes;
    an earth wiring cable connected to the ground electrode; and
    a main body that houses the circuit board, the main body being configured such that the pair of terminal fittings and the earth wiring cable protrude from an inside of the main body to an outside.

2. The surge protection device according to claim 1, wherein
    the pair of terminal fittings is directly mounted on the circuit board.

3. A field device comprising:
    the surge protection device according to claim 1; and
    a case main body in which the pair of power supply terminals is provided and the surge protection device is housed.

4. A field device comprising:
    the surge protection device according to claim 2; and
    a case main body in which the pair of power supply terminals is provided and the surge protection device is housed.

5. The field device according to claim 3, further comprising:
    a power supply terminal base provided inside the case main body, the power supply terminal base being provided with the pair of power supply terminals disposed thereon; and
    an other-terminal base provided inside the case main body, the other-terminal base being provided with a terminal other than the power supply terminals disposed thereon, wherein
    a height of the power supply terminal base and a height of the other-terminal base are different from each other.

6. The field device according to claim 4, further comprising:
    a power supply terminal base provided inside the case main body, the power supply terminal base being provided with the pair of power supply terminals disposed thereon; and
    an other-terminal base provided inside the case main body, the other-terminal base being provided with a terminal other than the power supply terminals disposed thereon, wherein
    a height of the power supply terminal base and a height of the other-terminal base are different from each other.

7. The field device according to claim 5, further comprising
    partition walls provided on a periphery of the pair of power supply terminals and the terminal other than the power supply terminals and configured to secure electrical isolation between the pair of power supply terminals and the terminal other than the power supply terminals.

8. The field device according to claim 6, further comprising partition walls provided on a periphery of the pair of power supply terminals and the terminal other than the power supply terminals and configured to secure electrical isolation between the pair of power supply terminals and the terminal other than the power supply terminals.

9. The surge protection device according to claim 1, wherein the pair of terminal fittings are arranged along an extending direction of the earth wiring cable, and distal ends of the terminal fittings are bent from proximal ends of the terminal fittings to extend obliquely to the extending direction.

10. The surge protection device according to claim 1, wherein the pair of terminal fitting of the surge protection device, the pair of power supply terminals of the field device and the power supply cable are directly connected to each other at a same position.

11. The surge protection device according to claim 1, wherein the pair of terminal fittings serves both as power-supply-side terminals to be connected to the power supply cable and as device-side terminals to be connected to the power supply terminals.

12. A surge protection device comprising:
a pair of terminal fittings to be physically connected to a power supply cable of a device to be protected;
a circuit board on which a surge protection element is mounted, the surge protection element including two electrodes connected to the pair of terminal fittings and a ground electrode configured to cause a surge current to flow to a ground when a surge voltage is applied between the two electrodes;
an earth wiring cable connected to the ground electrode; and
a main body that houses the circuit board, the main body being configured such that the pair of terminal fittings and the earth wiring cable protrude from an inside of the main body to an outside, wherein
the pair of terminal fittings serves also as connection terminal fittings for the device to be protected.

13. The surge protection device according to claim 12, wherein the pair of terminal fittings are arranged along an extending direction of the earth wiring cable, and distal ends of the terminal fittings are bent from proximal ends of the terminal fittings to extend obliquely to the extending direction.

14. The surge protection device according to claim 12, wherein the pair of terminal fitting of the surge protection device, the power supply cable of the device to be protected and the connection terminal fittings for the device to be protected are directly connected to each other at a same position.

\* \* \* \* \*